United States Patent
Lieven et al.

(10) Patent No.: US 9,108,714 B2
(45) Date of Patent: Aug. 18, 2015

(54) UNDER-FLAP STIFFENER FOR AIRCRAFT

(75) Inventors: Patrick Lieven, Fronton (FR); Eric Chavonet, Colomiers (FR); Daniel Bellet, Saint-Lys (FR)

(73) Assignee: AIRBUS OPERATIONS S.A.S., Toulouse (FR)

( * ) Notice: Subject to any disclaimer, the term of this patent is extended or adjusted under 35 U.S.C. 154(b) by 768 days.

(21) Appl. No.: 13/256,700

(22) PCT Filed: Mar. 15, 2010

(86) PCT No.: PCT/FR2010/050449
§ 371 (c)(1),
(2), (4) Date: Feb. 14, 2012

(87) PCT Pub. No.: WO2010/106271
PCT Pub. Date: Sep. 23, 2010

(65) Prior Publication Data
US 2012/0132747 A1    May 31, 2012

(30) Foreign Application Priority Data
Mar. 19, 2009 (FR) ...................................... 09 51761

(51) Int. Cl.
*B64C 1/00* (2006.01)
*B64C 1/06* (2006.01)
*B64C 1/12* (2006.01)

(52) U.S. Cl.
CPC ................. *B64C 1/064* (2013.01); *B64C 1/062* (2013.01); *B64C 1/12* (2013.01)

(58) Field of Classification Search
CPC .............. B64C 1/10; B64C 1/12; B64C 1/062
USPC ...................................... 244/119, 121, 117 R
See application file for complete search history.

(56) References Cited

U.S. PATENT DOCUMENTS

| | | | |
|---|---|---|---|
| 8,434,716 B2 * | 5/2013 | Koch et al. ..................... | 244/119 |
| 2004/0155148 A1 * | 8/2004 | Folkesson et al. ............ | 244/119 |
| 2006/0022088 A1 * | 2/2006 | Dazet et al. .................... | 244/121 |
| 2007/0095982 A1 | 5/2007 | Kismarton et al. | |
| 2007/0164152 A1 * | 7/2007 | Anderson et al. .......... | 244/118.1 |
| 2007/0164159 A1 * | 7/2007 | Koch et al. .................... | 244/121 |
| 2008/0149769 A1 * | 6/2008 | Koch et al. .................... | 244/121 |

FOREIGN PATENT DOCUMENTS

FR    2 898 105    9/2007

OTHER PUBLICATIONS

International Search Report Issued Oct. 13, 2010 in PCT/FR10/050449 filed Mar. 15, 2010.

* cited by examiner

*Primary Examiner* — Justin Benedik
(74) *Attorney, Agent, or Firm* — Oblon, McClelland, Maier & Neustadt, L.L.P.

(57) ABSTRACT

An assembly of longitudinal structural stiffeners for an aircraft including, in a front portion of the fuselage, a windscreen that is slightly recessed relative to the airplane nose, and a fuselage portion extending in alignment with the airplane nose up to the base of the windscreen. The stiffeners include a bending-resistance main plane and are arranged under the flap and connected to the fuselage along a force transfer line. For one or more of the stiffeners, the bending resistance main plane substantially coincides, at at least a certain number of points of the fuselage force transfer line, with the plane predetermined by the local normal to the fuselage surface and the longitudinal axis of the airplane. A method is also provided for calculating the shape of the stiffeners.

5 Claims, 2 Drawing Sheets

UNDER-FLAP STIFFENER FOR AIRCRAFT

Figure 1:
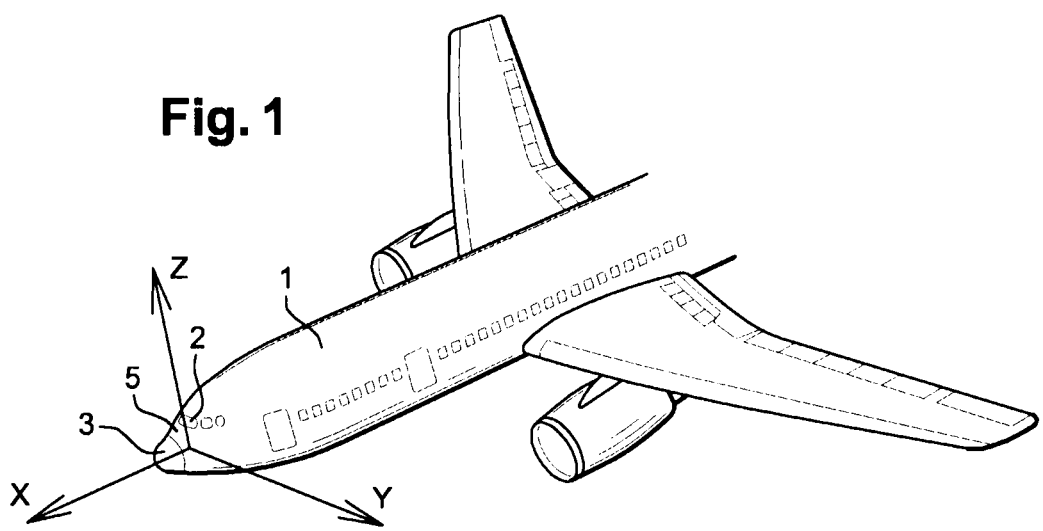

The invention relates to the field of aircraft fuselage structures.

A significant part of the critical cockpit equipment of aircraft, for example commercial jet airplanes, is located in the airplane nose. During the take-off and landing phases, the risk of the front portion of the airplane being hit by birds is extremely high. In effect, the birds' mass, combined with the relative speed of the airplane in relation to these birds, is transformed into considerable kinetic energy on impact, which is transformed into mechanical deformation energy.

With regard to these possible impacts, it is necessary for the airplane equipment, where the control electronics are positioned in the front portion of the airplane, and thus directly behind the most likely impact points, and of course the crew, to be protected as well as possible.

Apart from a direct impact on the windshield, which is design-critical for calculating the thickness and resistance of the windshield, an impact above it, in the portion called the airplane windshield fairing, risks jeopardizing the power generation equipment, whereas an impact below the windshield, in the portion called the airplane flap, jeopardizes the control screens and the crew.

The fuselage is supported by a structural assembly of frames and stiffeners, designed to transfer all the flight's normal mechanical forces. Under-dimensioning the fuselage's structural stiffeners can lead to at least part of the bird's mass traversing the fuselage and the destruction of the equipment involved, endangering the entire airplane.

The extent of this danger varies according to the airplane. In effect, the fuselage's relative angle with respect to the longitudinal axis of the airplane's movement typically varies between 20 and 35°. The greater the angle, the more the energy is dispersed over a small surface of the fuselage.

The objective of this invention is therefore to better take into account the possible bird impacts during the flight phases, while limiting the mass of the structural stiffeners.

To this end the invention relates firstly to an assembly comprising a fuselage surface and a plurality of longitudinal structural stiffeners; said stiffeners, of the type comprising a main plane of bending resistance substantially perpendicular to the fuselage surface, are positioned below a portion of said surface and secured to it along a force transfer line;

this assembly is such that, for several of said stiffeners, the stiffener's main plane of bending resistance substantially coincides, in at least a certain number of points $P_i$ of its surface force transfer line, with the plane $X_{Pi}N_i$ defined by the local normal $N_i$ to the surface and an already known impact axis $X_{Pi}$.

More specifically, the invention relates to the specific case of aeronautics and an assembly of stiffeners such that the surface is a portion of an aircraft fuselage called the flap, extending in alignment from the airplane nose to the base of a windshield, and that at every point the impact axis $X_{Pi}$ is the same axis of the aircraft's movement in flight.

It is understood that, at a given point of the stiffener, this main plane of bending resistance coincides with the reaction plane of an object striking the fuselage at the same point along the airplane's axis of movement during take-off or landing phases (which is not that of the stabilized level flight phase). A reinforcement is therefore placed here such that its maximum plane of bending resistance coincides with the plane subjected to the maximum stress in the event of an impact, which corresponds to the goal sought.

According to an advantageous embodiment, the stiffeners have an "I"-type cross-section comprising a core and two struts at the extremities of said core and perpendicular to it.

The invention relates secondly to an aircraft flap, designed to be positioned between the nose and windshield of said aircraft, comprising an assembly of stiffeners as defined above.

Similarly, the invention relates thirdly to an aircraft comprising a fuselage with an outer surface, comprising a plurality of longitudinal structural stiffeners, of the type comprising a core forming a main plane of bending resistance, substantially perpendicular to the fuselage surface, said stiffeners being positioned below a portion of said surface and secured to it along a force transfer line, and such that, for several of said stiffeners, the tangent plane of the stiffener's core substantially coincides, in at least a certain number of points $P_i$ of its fuselage force transfer line, with the plane $XN_i$ defined by the local normal $N_i$ to the fuselage surface and the longitudinal axis X of the aircraft.

The invention also relates to a method for calculating, for any known skew surface (5) designed to be reinforced by a plurality of longitudinal stiffeners, a series of points $P_i$ and normals $N_i$ defining a force transfer line for a stiffener (7), for a set of impact axes $X_{Pi}$ each corresponding to a point $P_i$ of the surface;

the method comprises the following steps:
choosing an initial contact point P1 on the skew surface, then, iteratively,
for each given point $P_i$ (i>=1), calculating the direction of the local normal Ni to the surface at this point $P_i$,
calculating the intersection curve Ci, of the plane $X_{Pi}N_i$, defined by the impact axis $X_{Pi}$ and the normal $N_i$, with the fuselage surface at the point $P_i$
calculating the coordinates of point $P_{i+1}$ on this curve Ci, at a predefined distance D from $P_i$.

This method makes it possible to establish, by any calculation means, the geometry of a set of shapes defined by their line of contact with the surface and their normal plane to this surface, according to a constraint, which here is the transfer of the reaction forces for an element arriving along a local impact axis $X_{Pi}$.

According to a particular mode corresponding to a simplified calculation method, at every point the impact axis $X_{Pi}$ is a single longitudinal axis X.

This layout avoids taking local aspects of the airflow around the surface into account, by approximating the impact direction at each point with the axis of the airplane's movement.

The invention also relates to software designed to implement the method as described.

In the case of realizations made of composites, the invention also relates to a flap made of composite material, of the type comprising at least two main tapes of fibers embedded in a resin; the flap is such that the preferred direction of one of the fiber tapes at each point of the flap, known as a spread tape, is defined using a calculation method described above.

Advantageously, in this case, the thickness of the spread tape of fibers at each point is defined using a method that takes into account the impact force at each point.

It is understood that these layouts allow the invention to be generalized to realizations in which the stiffeners are at least partially embedded in the flap itself.

Figure 4:
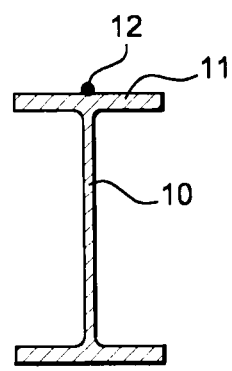
Figure 5:
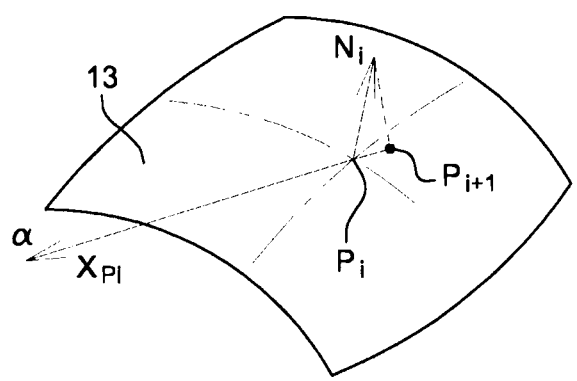
Figure 2:
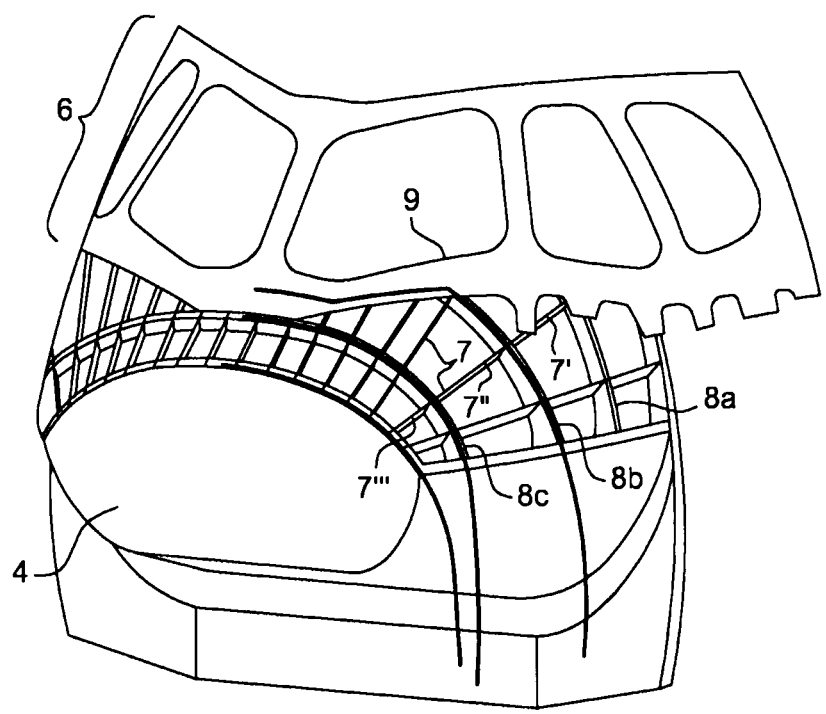
Figure 3:
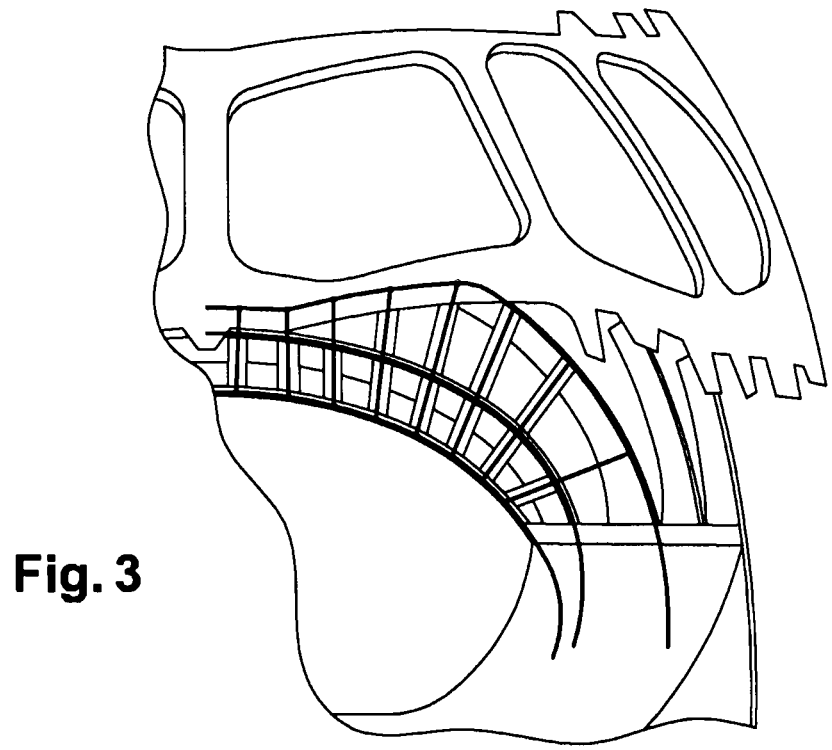

The goals and advantages of the invention will be better understood in reading the description and drawings of a particular embodiment, given as a non-limiting example, for which the drawings show:

FIG. 1: side view of the fuselage of an aircraft;

FIG. 2: cutaway view of the fuselage at the airplane windshield and flap;

FIG. 3: front view of the fuselage structure;

FIG. 4: straight cross-section of a traditional stiffener;

FIG. 5: schematic view of a fuselage portion and a stiffener.

The invention finds its position in the front part of an airplane fuselage 1 seen in a side view in FIG. 1; this mainly longitudinal fuselage comprises a windshield 2 that is slightly recessed relative to the airplane nose 3.

For the rest of the description, longitudinal axis X is defined as the aircraft's normal direction of movement; the terms front and rear are also used according to this normal direction of movement. The longitudinal axis X forms a normally horizontal plane with a transverse axis Y during the flight. An axis Z, which completes an orthogonal reference space with the longitudinal and transverse axes, is called the vertical axis; the terms upper and lower are used with respect to this vertical axis oriented towards the top of the airplane in normal flight position. It is noted that the vertical plane XZ is generally a plane of symmetry for the airplane.

A double curvature portion of fuselage called the flap 5 creates a shape transition between the airplane nose 3, the windshield 2, and more generally the vehicle's cabin.

FIG. 2 shows, also in a side view, the structure of the airplane's fuselage at its cockpit. This figure is limited to the structure 6 of the airplane's windshield 2, and the structure of the flap 5. The portion formed by the airplane's nose 3, which contains amongst others a radar, has a specific structure and is outside the framework of this invention. The transition between this airplane nose 3 and the airplane cabin is materialized by a sealed bottom 4 forming a shield, secured to the structure of the flap 5.

Similarly, the structure 6 of the airplane's windshield 2 forms a specific structural assembly, complying with specific standards and constraints, and is outside the framework of this invention.

It may, however, be noted that this structure 6 of the windshield comprises, in a known way, in the lower portion, generally at the base of the glass panels forming the windshield 2, structural elements 9 of a shape not detailed here and allowing stiffeners 7 and frames 8 to be attached.

The upper portion of the structure of the flap 5, which concerns us more specifically in this invention, comprises, in effect, firstly several mainly transverse frames 8, the sealed bottom 4 forming a special type of frame. Each of these frames 8 is symmetrical with respect to the vertical plane of symmetry XZ. In this non-limiting example, the structure of the flap 5 comprises, in addition to the sealed bottom 4, three transverse frames 8a, 8b, 8c.

The upper portion of the structure of the flap 5 further comprises an assembly of mainly longitudinal stiffeners 7 forming a grid with the frames 8. Each stiffener 7 is composed of several segments 7', 7", 7''', positioned substantially in line with one another, and each secured to a frame 8 at each of their extremities.

The connections of the stiffeners 7 are evenly spaced along the frame 4; there are, for example, half a dozen of these stiffeners 7 on each side of the airplane's vertical plane of symmetry XZ.

These frames 8 and these stiffeners 7 are elements that have a structural function. Their cross-section, of known type, for example "I"-shaped as shown in FIG. 3 and detailed in FIG. 4, comprises a core 10 and two struts 11 at the extremities of said core and perpendicular to it.

The exact shape, material and methods of attaching the frames and stiffeners to one another and to the rest of the airplane structure are of a type known per se and are outside the framework of this invention.

The "skin" 13 of the fuselage is secured onto the stiffeners 7 and the frames 8 by known methods that are outside the framework of the invention, for example by riveting onto the struts 11 of the stiffeners 7 and frames 8. It is noted that the line of contact 12 between the core 10 of the stiffener 7 and its upper strut 11 also constitutes the line through which fuselage forces are transferred by the stiffener 7.

In order to best transfer the forces induced at the impact applied over the fuselage during the flight, the stiffeners 7 have their cores 10 oriented substantially perpendicular to the fuselage's local plane, as shown in FIG. 2. The frames 8 ensure the fuselage's resistance to pressurization (core's plane parallel to a plane XZ).

The stiffeners 7 typically have a linear shape, for simplicity of production.

In this invention, the shape of each stiffener 7 (or stiffener segment) is varied according to the fuselage location in which it is placed.

Indeed, for at least a certain number of stiffeners 7, the local tangent plane of the core 10 of the stiffener 7 (which is also the main plane of bending resistance) coincides, in at least a certain number of points of the contact line 12 (and preferably all), with the plane defined by the longitudinal axis X and the local normal N to the fuselage (which is the optical reflection plane of a ray arriving along the airplane's longitudinal axis).

This means that the reaction force of a bird hitting the fuselage along the longitudinal axis of the airplane's flight is located precisely in the plane of the stiffener's core at that point. This layout is the one that maximizes the bending force to which the stiffener 7 can be subjected, and therefore minimizes the probability of fuselage being traversed by the bird.

The geometry of the stiffeners 7 therefore depends on the shape of the fuselage at the flap 5.

The shape of a stiffener 7 is defined by iterations, using a method implemented automatically, e.g. by software using as input the shape of the fuselage's surface at the airplane's flap 5.

The design principle is illustrated in FIG. 5.

In this stiffener design mode, described here in a non-limiting way, the method begins the calculation for a stiffener 7 from its contact point P1 with the skin 13 of the fuselage, at the perimeter of the sealed bottom 4, this contact point P1 being previously selected or being dependent on other constraints of the airplane. In the example illustrated in FIG. 3, a layout is chosen that comprises 8 stiffeners equally spaced on each side of the airplane's vertical plane of symmetry XZ.

For a given point $P_i$, the local normal direction $N_i$ to the fuselage's surface is calculated at this point $P_i$; this surface is fully known and stored in advance.

The longitudinal axis X and the normal $N_i$ thus define a plane $XN_i$, whose intersection with the fuselage's surface at the given point $P_i$ give a curve $C_i$ (which can be approximated in the vicinity of point $P_i$ by a straight line). Then the coordinates are calculated for a point $P_{i+1}$ on this curve $C_i$, at a predefined distance D from $P_i$, for example 100 mm in this example.

It is understood that, in this way, starting from point $P_1$ a point $P_2$ is defined, then the operation is repeated at point $P_2$, which gives a point $P_3$, etc. until, by successive iterations, the frame 8a farthest from the sealed bottom 4 is reached.

The sequence of points $P_i$ and associated normals $N_i$ thus fully define the shape of the core of the stiffener 7 starting from point P1 at the sealed bottom. This stiffener may potentially be formed from several segments without changing the design principle.

This gives an assembly of stiffeners 7 positioned in a fan shape from the sealed bottom 4. Compared to an assembly of "traditionally" positioned stiffeners (illustrated in FIG. 2) an increasingly large angular separation relative to the airplane's longitudinal axis X is observed; this is especially noticeable on the most lateral of the stiffeners 7.

Clearly the airplane's sealed bottom 4 has been chosen for starting the calculation, but any arbitrary initial point on the surface of the flap 5 can be chosen without changing the method.

The scope of this invention is not limited to the details of the forms of embodiment considered above as an example, but on the contrary extends to modifications in the reach of the expert.

In a variant, the structure of the flap 5 is realized in a single piece comprising integrated structural reinforcements, oriented as described above. These structural elements thus fulfill the same optimized force transfer function in the event of a bird impact.

Instead of using stiffeners 7 with an ideal shape, which means that they must be defined and manufactured one by one, it is possible in a variant to use linear stiffener segments 7', 7'', 7''', and attach them to the frames 8 orienting each of them according to the direction that is tangential to the stiffener 7 half-way between two frames 8, as described above.

This results in a stiffener 7 positioned in the form of an arc and consisting of several linear segments.

This variant simplifies the implementation of the invention, while mainly retaining the virtues, especially if the frames 8 are close to each other.

For simplicity, the description given has used a single longitudinal axis to define the direction of a bird's impact on the fuselage.

In fact, this axis varies according to the points of the flap, due to the flow of air around it; this can substantially change the impact direction at the speeds in question. The shape of the stiffeners 7 should therefore ideally take this impact direction into account to ensure optimal force transfer.

This means that, at each point $P_i$ of the surface, the impact axis $X_{Pi}$ as a function of point $P_i$ is not necessarily a single longitudinal axis X.

In this case, the calculation method is simply changed to take the impact axis $X_{Pi}$ into account at each point.

The local impact axis data can, for example, be derived from aerodynamic calculations of the flow around the vehicle's nose, adapted to calculate the trajectory of an object with the aerodynamic characteristics of a bird, and be stored in a database comprising, for each point $P_i$ of the surface of the flap 5, the coordinates of the associated impact direction $X_{Pi}$.

So far in the description, the impact direction has been taken into account but not the force of the impact. However, for each point $P_i$ it is possible to calculate a relative impact force $F_i$ at this point $P_i$ (for an object with a standardized weight and shape, for example as an isolated 1 kg received along the substantially longitudinal axis $X_{Pi}$ at a speed of 400 km/h) and its normal component $F_{Ni}$ and, from this, to propose a thickness for the core 10 of the stiffener 7 at this point $P_i$, or, more generally, the value of a geometric parameter of the stiffener 7 allowing the transfer of this normal component $F_{Ni}$ and thus, for example, proportional to this component $F_{Ni}$.

In the case of a flap realized in a composite material of the type comprising at least two main directions of fibers embedded in a resin, the method for calculating the stiffeners' shape can also determine the preferred direction of a tape of fibers at each point of the flap, these fibers themselves constituting stiffeners of the surface. These fibers will then be positioned in a fan shape starting from the airplane's sealed bottom.

In this case the calculation, which has just been described according to the impact force at each point, makes it possible to propose a thickness for this spread tape of fibers, and thus the local thickness of the flap at each point.

The description has been given for the case of an aircraft subject to a possible bird impact and even more specifically in the case of the airplane's flap. It also applies to an aircraft subjected to a hail event, by changing the longitudinal impact axis due to the vertical component of the hailstones' velocity. In the case of flaps made of composites, several spread tapes of fibers can be superimposed, each designed for a potential type of impact, and therefore having differently oriented fiber directions.

However, it can be generalized to a body subjected to a stream of particles, for example a skew-shaped solar panel for a satellite or space craft subjected to the flow of solar wind particles.

The invention claimed is:

1. An assembly comprising:
    a fuselage surface; and
    a plurality of longitudinal structural stiffeners, the stiffeners comprising a main plane of bending resistance substantially perpendicular to the fuselage surface, being positioned below a portion of the fuselage surface and secured to the fuselage surface along a force transfer line;
    wherein, for plural of the stiffeners, the main plane of bending resistance of the stiffener substantially coincides, in at least a certain number of points $P_i$ of its surface force transfer line, with the plane $X_{Pi}N_i$ defined by the local normal $N_i$ to the surface and an already known impact axis $X_{Pi}$,
    wherein the stiffeners have an "I"-type cross-section comprising a core and two struts at extremities of the core and perpendicular to the core, and
    wherein the core forms the main plane of bending resistance.

2. An assembly according to claim 1, wherein the surface is a portion of an aircraft fuselage of a flap, extending in alignment from an airplane nose to a base of a windshield, and at every point $P_i$ the impact axis $X_{Pi}$ is the same axis X of the aircraft's normal movement in flight.

3. A flap for aircraft, configured to be positioned between a nose and windshield of the aircraft, the flap comprising:
    an assembly of stiffeners, the stiffeners comprising a main plane of bending resistance substantially perpendicular to a fuselage surface, being positioned below a portion of the fuselage surface and secured to the fuselage surface along a force transfer line;
    wherein, for plural of the stiffeners, the main plane of bending resistance of the stiffener substantially coincides, in at least a certain number of points $P_i$ of its surface force transfer line, with the plane $X_{Pi}N_i$ defined by the local normal $N_i$ to the surface and an already known impact axis $X_{Pi}$,
    wherein the stiffeners have an "I"-type cross-section comprising a core and two struts at extremities of the core and perpendicular to the core, and
    wherein the core forms the main plane of bending resistance.

4. A flap according to claim 3, wherein at every point $P_i$ the impact axis $X_{Pi}$ is the same axis X of the aircraft's normal movement in flight.

5. An aircraft comprising:

a fuselage with an outer surface;

a plurality of longitudinal structural stiffeners comprising a core forming a main plane of bending resistance, substantially perpendicular to the fuselage surface, the stiffeners being positioned below a portion of the fuselage surface and secured to the fuselage surface along a force transfer line; and wherein, for plural of the stiffeners, the tangent plane of the core of the stiffener substantially coincides, in at least a certain number of points $P_i$ of its fuselage force transfer line, with the plane $XN_i$ defined by the local normal $N_i$ to the fuselage surface and the longitudinal axis X of the aircraft, wherein the stiffeners have an "I"-type cross-section comprising a core and two struts at extremities of the core and perpendicular to the core, and wherein the core forms the main plane of bending resistance.

* * * * *